Sept. 15, 1964 J. D. WOOD 3,148,567
FORCE MULTIPLICATION DEVICE
Filed Aug. 7, 1961
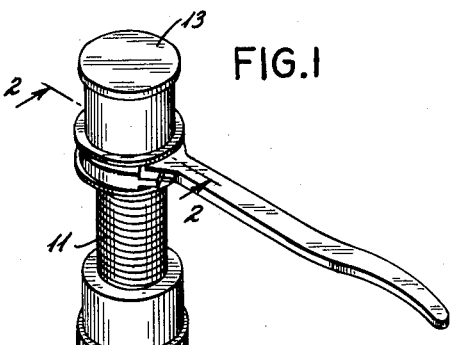
FIG. 1
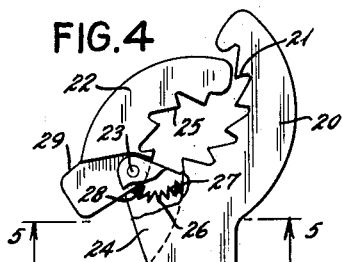
FIG. 4
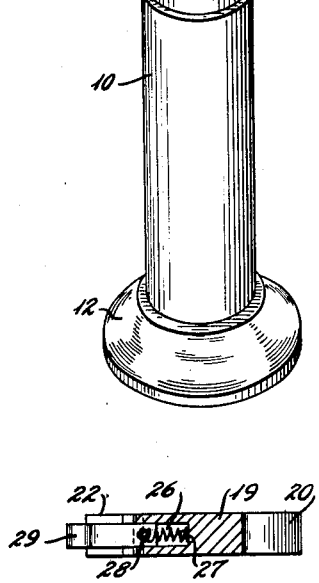
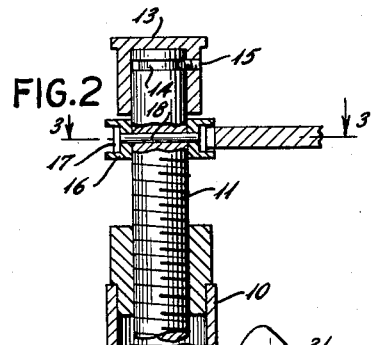
FIG. 2
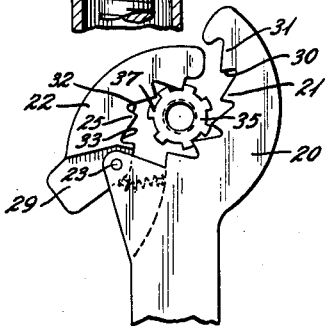
FIG. 6
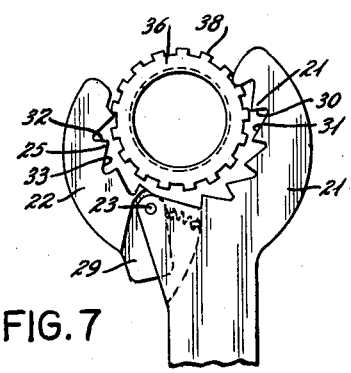
FIG. 5
FIG. 7
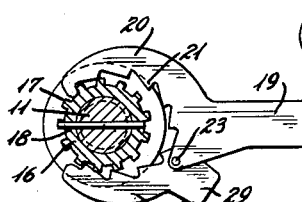
FIG. 3
INVENTOR
J. D. WOOD
BY
ATTORNEY

United States Patent Office 3,148,567
Patented Sept. 15, 1964

3,148,567
FORCE MULTIPLICATION DEVICE
John David Wood, Box 2047, Concord, N.C.
Filed Aug. 7, 1961, Ser. No. 129,817
3 Claims. (Cl. 81—97)

This invention relates to the performance of work by force multiplication devices and to the nature of the devices by which such work is accomplished.

The invention relates particularly to force multiplication devices including complementarily threaded engaging members and removable leverage mechanism for producing such relative movement.

Prior devices including jacks and operating handles or levers have not been satisfactory due to limitations in degrees of usefulness as well as such structures being expensive, cumbersome and awkward to use.

It is an object of the invention to provide relatively movable threaded members for exerting pressure in a direction toward and from each other and an operating handle or lever capable of producing rotation of one of the members relative to the other and which handle or lever also can be detached and used independently and for accommodating itself to various sizes.

Another object of the invention is to provide a relatively simple inexpensive combination of relatively movable complementarily threaded force multiplication members having a series of peripheral projections and a ratchet type wrench or handle for producing relative movement as well as a handle with a fixed and a movable jaw pivotally connected in such a manner that one of the jaws can move within the other to adapt itself to nuts or ratchets of different sizes.

Other objects and advantages of the invention will be apparent from the following description taken in conjunction with the accompanying drawing wherein:

FIG. 1 is a perspective illustrating one application of the invention;

FIG. 2, a fragmentary longitudinal section on the line 2—2 of FIG. 1;

FIG. 3, a section on the line 3—3 of FIG. 2;

FIG. 4, an enlarged detail of the lever or handle of FIG. 1;

FIG. 5, a section on the line 5—5 of FIG. 4; and

FIGS. 6–7, details of the head of the lever used in connection with ratchet members or nuts of different sizes.

Briefly stated, the invention is a pair of complementarily threaded members capable of being used for exerting force toward and from each other but for purposes of illustration being shown as a jack with one of the members being provided with a ratchet forming nut and with a lever forming handle provided with a fixed and a pivoted gripping jaw, each with multiple teeth or projections to enable use on nuts of varying size. The lever forming handle is capable of being used to rotate the ratchet forming nut of the jack or any other nut having projections and recesses of a commensurate size for engagement by the gripping jaws thereof.

With continued reference to the drawing, complementary internally and externally threaded telescopic members 10 and 11 are provided which when their threads are in registration can be caused to move toward and from each other by the rotation of one relative to the other. In FIG. 1 these members are employed as portions of a screw type jack, the member 10 having an enlarged base 12 and a head forming cap 13. The upper end of the externally threaded member 11 is provided with an annular groove 14 in which the inner end of a set screw 15 carried by the cap 13 is loosely received. On the externally threaded member 11 is provided a ratchet forming nut 16 provided with teeth 17, such ratchet forming nut being fixed to the externally threaded member 11 by means of a pin 18. Thus rotation of the ratchet forming nut will produce rotation of the externally threaded member 11 relative to the member 10 mounted on the base 12.

The rotation of the externally threaded member may be accomplished by means of a handle forming lever 19 having a fixed arcuate jaw 20 with gripping projections 21 along the entire inner periphery and a movable arcuate jaw 22 secured by a pivot 23 extending through a pair of projecting lugs 24 on the lever 19. The pivoted jaw 22 likewise has gripping projections 25 along the entire inner periphery and such jaw is of a length that it can swing inwardly of the fixed jaw to accommodate itself to nuts of varying sizes. The pivoted jaw is normally biased towards the fixed jaw by means of a spring 26, the ends of which engage over projections 27 on the fixed jaw and 28 on the pivoted jaw. In order to open the jaws or to move the pivoted jaw away from the fixed jaw, a manipulating boss 29 is provided in the form of an extension on the innermost end of the pivoted jaw.

The gripping projections or teeth 21 on the fixed jaw have substantially radial surfaces 30 and cam surfaces 31 and the gripping projections or teeth 25 on the movable jaw have substantially radial surfaces 32 and cam surfaces 33 so that when lever 19 is applied to the ratchet forming nut 16 the radial surfaces 30 and 32 will engage the teeth 17 and rotate such nut when force is applied in one direction. When force is applied in the opposite direction the cam surfaces 31 and 33 will override the teeth 17 and permit the lever 19 to be rotated in the opposite direction without rotating nut 16.

As illustrated in FIGS. 6 and 7 the lever 19 may be applied to nuts 35 and 36 having projections 37 and 38 respectively with the nuts 35 and 36 being illustrative of the wide range of sizes which the lever 19 can accommodate. The lever 19 is applied in the same manner as heretofore disclosed so that the nuts can be tightened to any desired degree of tightness without removing the lever therefrom. The nuts may be loosened by rotating the lever 19 substantially 180° and applying such lever to the nut in a manner reverse to that illustrated in FIGS. 6 and 7.

In the operation of the device a ratchet forming nut 16 is fixed on an externally threaded member 11 of a jack. The lever 19 is applied to the ratchet forming nut 16 and when force is exerted to such lever in one direction, the externally threaded member 11 will be rotated and caused to move out of the internally threaded member 10. When the lever 19 is moved in the opposite direction, the nut 16 will not be rotated and the members 10 and 11 will remain in relatively fixed position. In order to lower the member 11 relative to the member 10, the lever 19 is removed from the nut, rotated substantially 180° and reapplied so that force in one direction will rotate the nut and cause the threaded member 11 to be retracted within the threaded member 10.

It will be apparent from the foregoing that a relatively simple force multiplication device or tool is provided having gripping projections or teeth which engage projecting teeth on the periphery of a cooperating nut to rotate such nut when force is applied in one direction and will not rotate such nut when force is applied in the opposite direction.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A force multiplication device comprising a handle forming lever having a fixed arcuate jaw, a plurality of gripping projections along the inner periphery of said fixed jaw, each of said gripping projections having a substantially radial surface and a cam surface, a pair of projecting lugs on said lever, a movable arcuate jaw pivotally mounted on said projecting lugs in opposed relation to said fixed arcuate jaw, a plurality of gripping projections along the inner periphery of said movable arcuate jaw, each of said movable jaw projections having a substantially radial surface and a cam surface, said movable jaw being of a length to permit an end portion thereof to swing inwardly of the free end of said fixed jaw, spring means normally biasing said movable jaw toward said fixed jaw, and a manipulating boss on one end of said movable jaw to open said jaws when force is applied thereto.

2. A force multiplication tool for application to a fastening element having a plurality of annular projections, said tool comprising a handle, a fixed arcuate jaw having a concave inner periphery on one end of said handle, a movable jaw having a concave inner periphery pivotally mounted on said handle adjacent to said fixed jaw and in opposed relation thereto, a plurality of gripping projections along the inner periphery of each jaw, each gripping projection having a radial surface and a cam surface, said cam surfaces being in opposed relation to permit said tool to be rotated in one direction without rotating said fastening element, said movable jaw being of a length to permit an end portion thereof to swing inwardly of the free end of said fixed jaw, and spring means normally biasing said movable jaw toward said fixed jaw.

3. A force multiplication device comprising a handle-forming lever, a fixed arcuate jaw on one end of said lever having a concave inner periphery, a plurality of gripping projections along the inner periphery of said fixed jaw, a movable arcuate jaw having a concave inner periphery pivotally mounted on said fixed jaw in opposed relation thereto, a plurality of gripping projections along the inner periphery of said movable jaw, said movable jaw being of a length to permit an end portion thereof to swing inwardly of the free end of said fixed jaw, spring means normally urging said movable jaw toward said fixed jaw, and means for manipulating said movable jaw relative to said fixed jaw.

References Cited in the file of this patent

UNITED STATES PATENTS

| | | |
|---|---|---|
| 740,878 | Lewis | Oct. 6, 1903 |
| 752,837 | Hardin | Feb. 23, 1904 |
| 874,545 | Scribner | Dec. 24, 1907 |
| 1,095,616 | Adams | May 5, 1914 |
| 1,184,061 | Adams | May 23, 1916 |
| 1,593,542 | Shoemaker | July 20, 1926 |
| 1,812,938 | Dunham | July 7, 1931 |
| 2,519,073 | Schaub | Aug. 15, 1950 |
| 2,713,803 | Schwaiger | July 26, 1955 |
| 3,003,379 | Pribitzer | Oct. 10, 1961 |

FOREIGN PATENTS

| | | |
|---|---|---|
| 828,676 | Germany | Jan. 21, 1952 |

UNITED STATES PATENT OFFICE
CERTIFICATE OF CORRECTION

Patent No. 3,148,567                            September 15, 1964

John David Wood

It is hereby certified that error appears in the above numbered patent requiring correction and that the said Letters Patent should read as corrected below.

In the heading to the printed specification, line 3, for "John David Wood, Box 2047, Concord, N. C." read -- John David Wood, Concord, N. C. (Box 2047, West Palm Beach, Fla.) --.

Signed and sealed this 12th day of January 1965.

(SEAL)
Attest:

ERNEST W. SWIDER
Attesting Officer

EDWARD J. BRENNER
Commissioner of Patents